United States Patent [19]

Song

[11] Patent Number: 5,463,289
[45] Date of Patent: Oct. 31, 1995

[54] FIRST GRID MUTING CIRCUIT

[75] Inventor: Moon J. Song, Suwon, Rep. of Korea

[73] Assignee: Samsung Electronics Co., Ltd., Suwon, Rep. of Korea

[21] Appl. No.: 189,513

[22] Filed: Jan. 31, 1994

[30] Foreign Application Priority Data

Jan. 30, 1993 [KR] Rep. of Korea ............... 93-1189
Feb. 26, 1993 [KR] Rep. of Korea ............... 93-2978

[51] Int. Cl.$^6$ ....................... H01J 29/52
[52] U.S. Cl. ....................... 315/384; 348/634
[58] Field of Search ............... 315/381, 384; 348/634

[56] References Cited

U.S. PATENT DOCUMENTS 5,077,502 12/1991 Shaklee et al. ............... 315/383
5,250,878 10/1993 Rothe et al. ............... 315/384

Primary Examiner—Theodore M. Blum
Attorney, Agent, or Firm—Ladas & Parry

[57] ABSTRACT

A first grid muting circuit for a monitor display for smooth muting operation of a muting circuit portion to provide a stable picture to a viewer can be favorably applied to a monitor circuit by a microcomputer for supplying a muting signal to blocks per corresponding modes, a contrast muting circuit portion for muting the muting signal to a predetermined level, a video circuit for outputting the muted contrast signal as a video signal, a first grid drive portion for driving a first grid circuit, and the first grid circuit for outputting a first grid signal for controlling a cathode ray tube to a vertical blanking circuit in accordance with a control signal of the first grid drive portion. The first grid muting circuit further has a plurality of switches for selectively switching a positive power supply voltage in accordance with the muting signal of the microcomputer to output the switched positive power supply voltage, and resistors for variably adjusting a negative power supply voltage in accordance with a predetermined variable resistance value to output the adjusted negative power supply voltage, thereby minutely controlling the operation of a muting circuit portion to provide the stable picture.

4 Claims, 5 Drawing Sheets

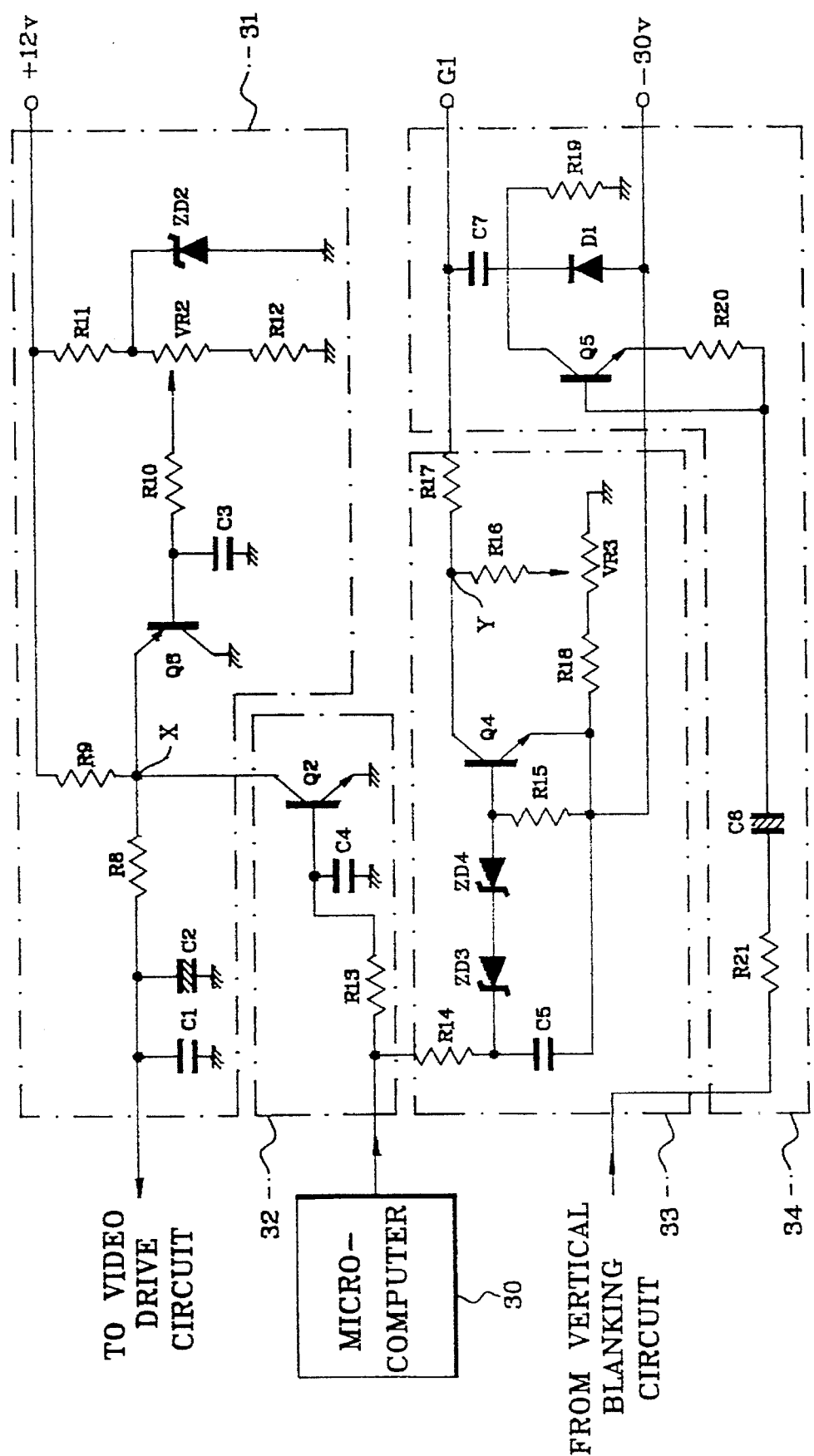

FIRST GRID MUTING CIRCUIT

BACKGROUND OF THE INVENTION

1. Field of the Invention

The present invention relates to a first grid circuit for a monitor display, and more particularly to a first grid muting circuit wherein a first grid circuit included in a cathode ray tube (CRT) is smoothly muted during mode conversion or power-on state of a monitor to prevent distorted display of raster, thereby providing clear picture on the CRT.

2. Description of the Prior Art

Generally, first grid muting circuits serve in such a manner that thermoelectrons are emitted to collide against a phosphor screen with thin electron beams to arbitrarily control the quantity of electrons colliding against the phosphor screen by means of an electron gun. The electron gun consists of a cylindrical cathode, grid and anode, in which a first grid in the grid is an inhibit grid for controlling the quantity of the electrons emitted from the cathode to control the variations of luminescence or brightness.

FIG. 1 is a block diagram showing a general muting circuit according to a conventional technique.

The muting circuit includes a muting detection portion 1 for receiving horizontal and vertical sync signals to output a muting signal upon mode conversion or power-ion state, a video muting control portion 2 connected to the muting detection portion 1 for receiving the muting signal therefrom to output a control signal, and a video contrast portion 3 connected to the video muting control portion 2 for receiving the control signal therefrom to control a video signal, thereby varying a luma signal.

In the conventional muting circuit constructed as above, once the horizontal and vertical sync signal among display signals from a computer are supplied to the muting detection portion 1, the muting detection portion 1 detects the input signal at the initial state of the sync signals (i.e., the time of power on), or at the changing state of the polarity of the sync signals (i.e., the time of mode conversion), and then supplies the muting signal to the video muting control portion 2. The video muting control portion 2 cuts off the video contrast portion 3 connected to the output terminal thereof, so that the control is canceled to mute the video signal.

At this time, the video contrast portion 3 is formed to increase or decrease the amplification of the video signal of the computer.

However, since the muting circuit is formed to control the video signal, raster distortion occurs on the picture when power of the monitor is turned on or the mode is converted at the time of reviving the back raster (i.e., at the time of shifting the CRT from a cut-off state to an active state).

SUMMARY OF THE INVENTION

The present invention is devised to solve the above-described problems. Therefore, it is an object of the present invention to provide a first grid muting circuit which does not display raster distortion during power-on or mode conversion state by muting a video signal and a first grid of a CRT during the time of power-on or mode conversion state.

It is another object of the present invention to provide a first grid muting circuit for providing more stable picture to a viewer by smoothly performing the muting operation of the muting circuit portion of respective blocks.

To achieve the above object of the present invention, there is provided a muting circuit which includes a muting detection portion for receiving horizontal and vertical sync signals from a peripheral circuit to output a muting signal during power-on or mode conversion state, a video muting control portion connected to an output terminal of the muting detection portion for outputting a control signal to control a video contrast portion in accordance with the muting signal of the muting detection portion, and the video contrast portion connected to an output terminal of the video muting control portion for controlling the luminescence of a video signal supplied from a computer in accordance with the control signal from the video muting control portion. Here, a first grid muting circuit has a microcomputer for supplying the muting signal to blocks per corresponding modes, a first grid muting control portion connected to an output terminal of the microcomputer for outputting a control signal for controlling a first grid circuit in accordance with the muting signal from the microcomputer, and the first grid circuit connected to an output terminal of the first grid muting control portion for controlling a first grid of a cathode ray tube in accordance with the control signal from the first grid muting control portion to prevent the generation of back raster in the cathode ray tube.

To achieve another object of the present invention, a first grid muting circuit includes a microcomputer for supplying a muting signal to blocks per corresponding modes, a contrast muting circuit portion connected to one branching point of an output terminal of the microcomputer for muting the muting signal to a predetermined level, a video circuit connected to an output terminal of the contrast muting circuit portion for outputting the muted contrast signal as a video signal, a first grid drive portion connected to the other branching point of the output terminal of the microcomputer for driving a first grid circuit, and the first grid circuit for outputting a first grid signal for controlling a cathode ray tube to a vertical blanking circuit in accordance with a control signal of the first grid drive portion. Furthermore, the first grid muting circuit has a plurality of switches connected between the other branching point of the output terminal of the microcomputer and the first grid muting drive portion for selectively switching a positive power supply voltage in accordance with the muting signal of the microcomputer to output the switched positive power supply voltage, and resistors connected between the first grid muting drive portion and the first grid circuit for variably adjusting a negative power supply voltage in accordance with a predetermined variable resistance value to output the adjusted negative power supply voltage, whereby the operation of a muting circuit portion is minutely controlled to provide a stable picture.

BRIEF DESCRIPTION OF THE DRAWINGS

The above objects and other advantages of the present invention will become more apparent by describing in detail preferred embodiments thereof with reference to the attached drawings in which:

FIG. 4 is a detailed circuit diagram embodying the first grid muting circuit shown in FIG. 2;

3

Figure 1:
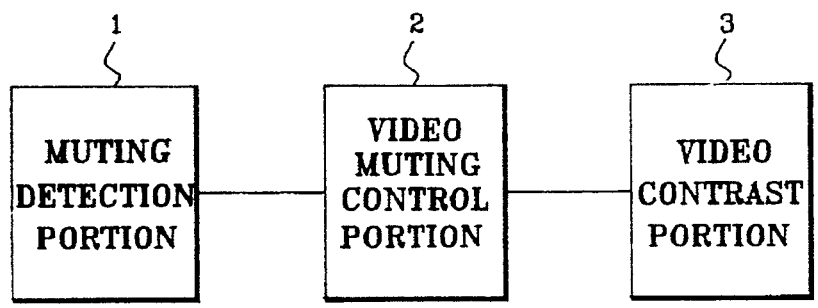
FIG. 1 is a block diagram showing a general muting circuit by a conventional technique.
Figure 2:
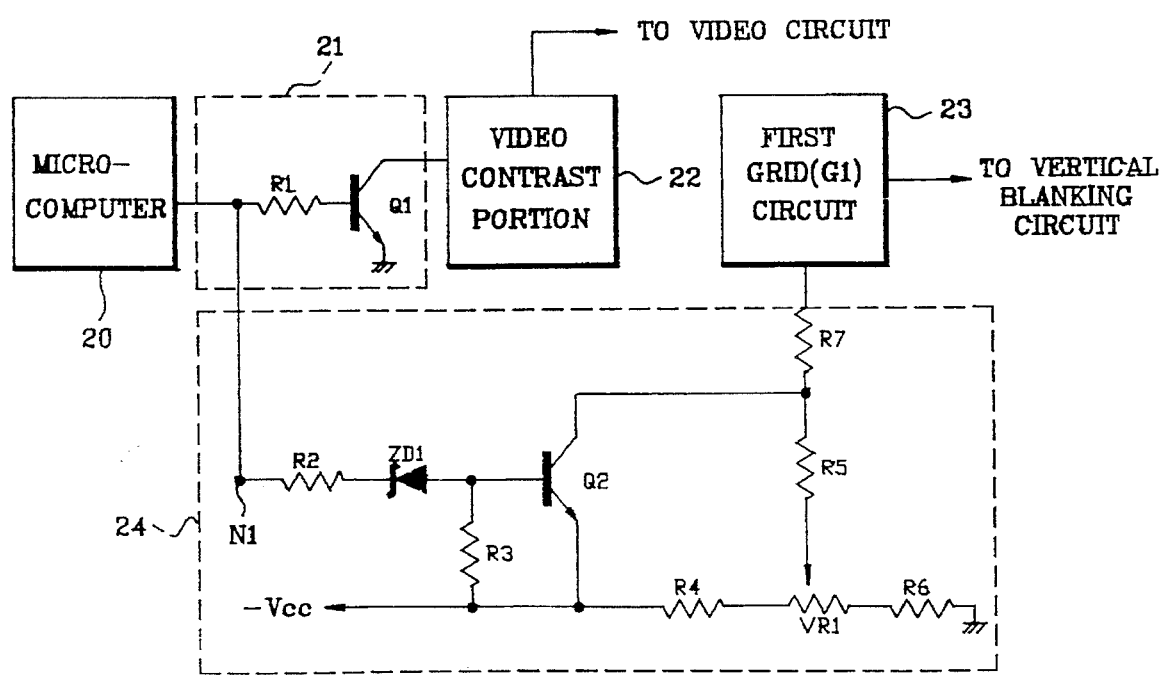
FIG. 2 is a block diagram showing a first embodiment of a first grid muting circuit according to the present invention.
Figure 6:
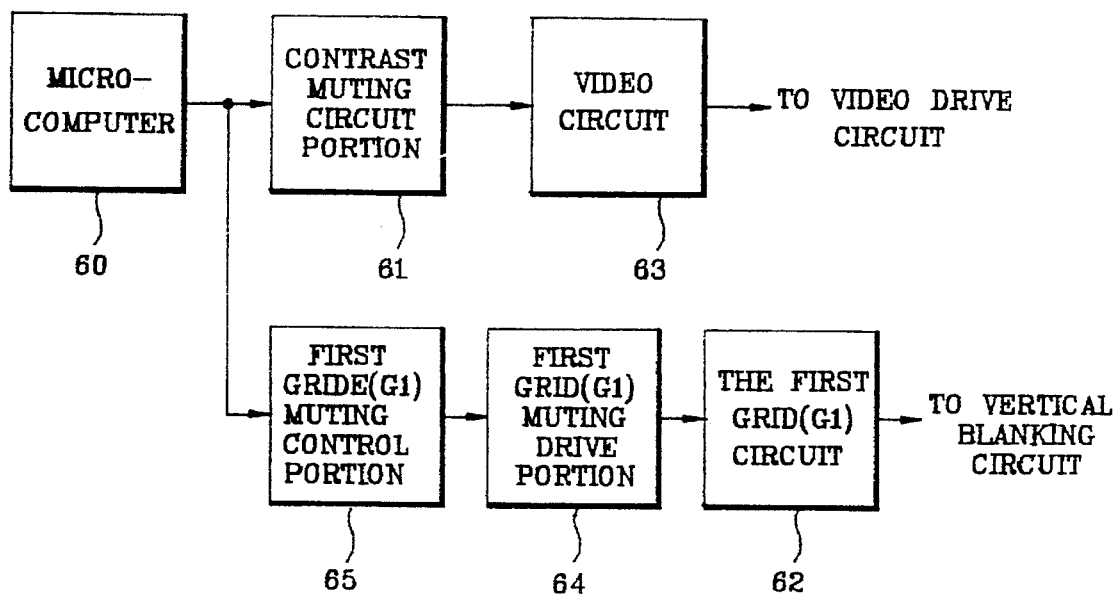
Figure 7:
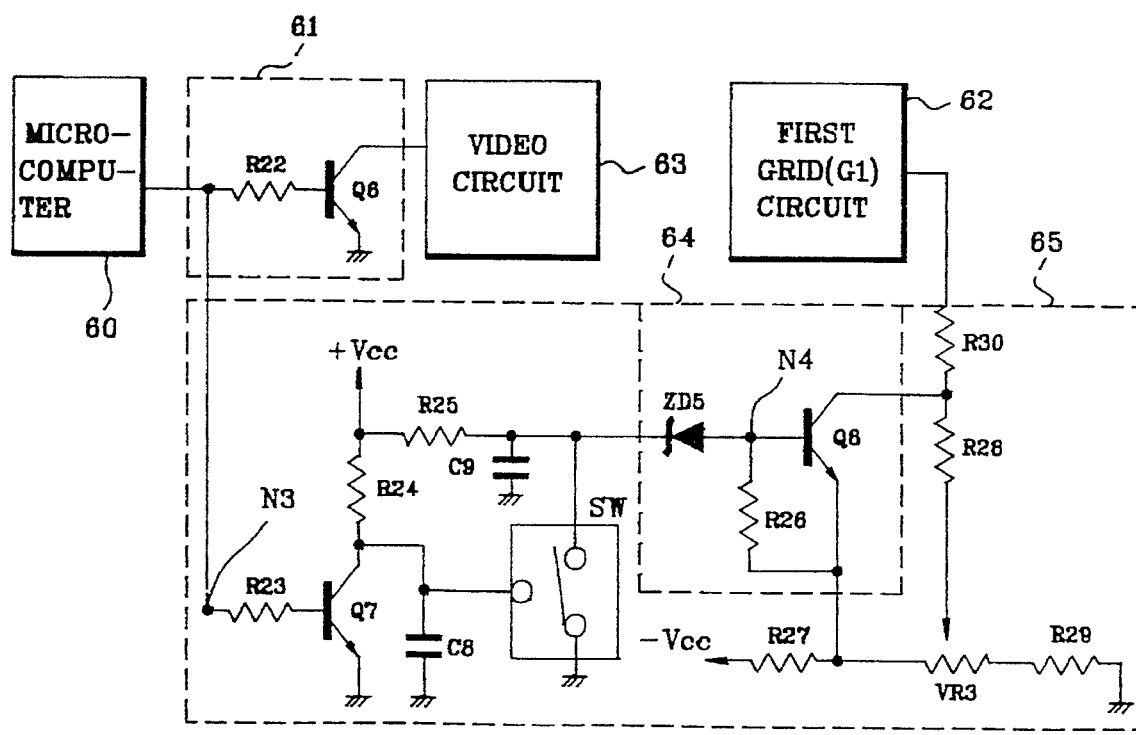
Figure 8:
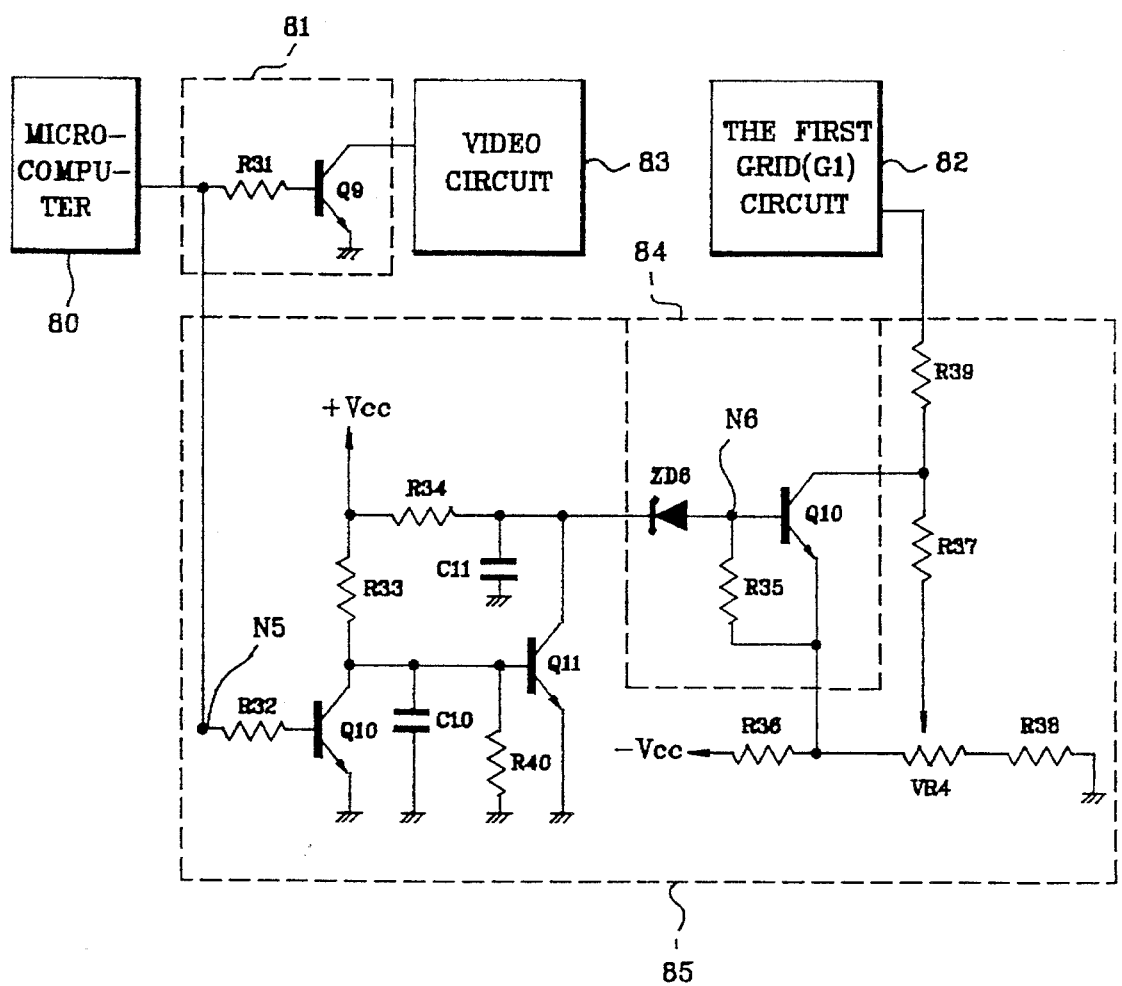

FIGS. 5A to 5C are waveforms showing the operational statue of the first grid muting circuit according to the present invention;

FIG. 6 is a block diagram showing a third embodiment of the first grid muting circuit according to the present invention;

FIG. 7 is a detailed circuit diagram showing the first grid muting circuit shown in FIG. 6;

FIG. 8 is a detailed circuit diagram of a fourth embodiment of the first grid muting circuit according to the present invention;

FIG. 9D shows an operational waveform according to the first grid muting circuit shown in FIG. 2;

FIG. 9E shows an operational waveform according to the first grid muting circuit shown in FIG. 7; and FIG. 9F shows an operational waveform according to the first grid muting circuit shown in FIG. 8.

DETAILED DESCRIPTION OF THE PREFERRED EMBODIMENTS

FIG. 2 is a block diagram showing a first embodiment of the first muting circuit according to the present invention.

Here, the first grid muting circuit has a microcomputer 20 for supplying a muting signal from a microprocessor to respective blocks per corresponding modes, and a video muting circuit portion 21 connected to one branching point of the output terminal of the microcomputer 20 for muting a video signal. Also, a video contrast portion 22 is connected to the output terminal of the video muting circuit portion 21 for adjusting the muted video signal, and a first grid drive portion 24 is connected to the other branching point of the output terminal of the microcomputer 20 for driving a first grid circuit 23.

The first grid drive portion 24 is formed of resistors R5 and R7 connected to the input terminal of the first grid circuit 23, and a transistor Q2 having its collector connected in parallel with the resistors R5 and R7. In addition, the first grid drive portion 24 includes a variable resistor VR1 connected to resistors R4 and R6 serially connected to the emitter of the transistor Q2, and the resistor R5, the resistors R2 and R3, and a Zener diode ZD1 commonly connected to the base of the transistor Q2 and the other branching point of the output terminal of the microcomputer 20.

The video muting circuit portion 21 is connected to one branching point of the output terminal of the microcomputer 20 and the input terminal of the video contrast portion 22, and is formed of a transistor Q1 and a resistor R1 connected to the base of the transistor Q1.

In the first grid muting circuit constructed as above, a power supply voltage is applied to respective blocks, and the microcomputer 20 supplies a predetermined muting signal to the video muting circuit portion 21 and the first grid drive portion 24.

By this operation, the muting signal drives the transistor Q1 via the resistor R1 to permit the video contrast portion 22 to supply the video signal adjusted to a predetermined level to a video circuit (not shown).

The muting signal from the microcomputer 20 is supplied to the base of the transistor Q2 via the resistor R2 of the first grid drive portion 24 connected to the other branching point of the microcomputer 20 and the Zener diode ZD1, thereby turning on the transistor Q1. Here, the level of the muting signal appearing on a node point N1 is as shown in FIG. 9D.

At this time, if the first grid control voltage provided from the resistor R4 to R7 via the variable resistor VR1 respectively connected in parallel with the collector and base of the transistor Q2 becomes the same as a negative power supply voltage Vcc the first grid circuit 23 is supplied with a predetermined voltage via the resistor R7 to act as a signal for lowering the luma signal of the CRT.

Even though the muting signal is not output from the microcomputer 20, the voltage formed by the resistors R5 and R7 and the variable resistor VR1 is supplied to the first grid circuit 23 as a reference voltage.

Finally, the control voltage adjusted by the first grid circuit is supplied to a vertical blanking circuit not shown.

Figure 3:
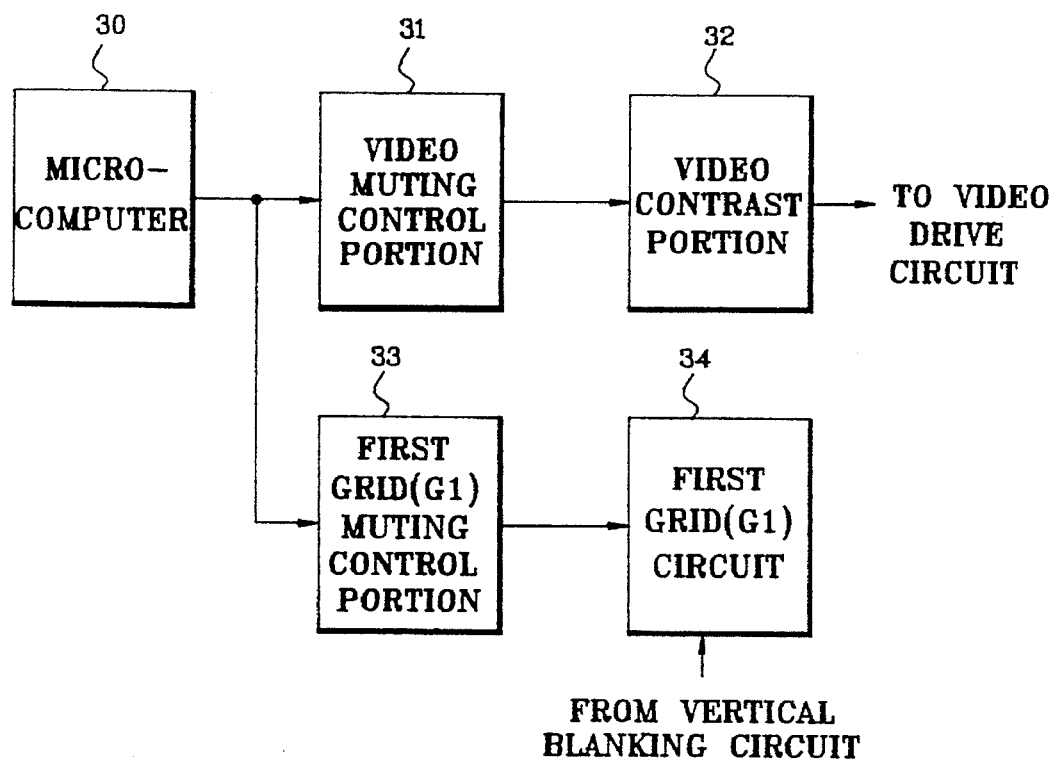
FIG. 3 is a block diagram showing a second embodiment of a first grid muting circuit according to the present invention.

As shown in FIG. 3, a first grid muting circuit as includes a microcomputer 30 for receiving horizontal and vertical sync signals during power-on or mode conversion state to supply an internally muted muting signal to both a video muting control portion 31 and a first grid muting control portion 33. The video muting control portion 31 is connected to the output terminal of the microcomputer 30 for outputting a control signal to control a video contrast portion 32 in accordance with the muting signal. The video contrast portion 32 is connected to the output terminal of the video muting control portion 31 for controlling the luminescence of a video signal from a computer in accordance with the control signal from the video muting control portion 31 to output it to a video drive circuit (not shown). The first grid muting control portion 33 is connected to the output terminal of the microcomputer 30 for outputting a control signal to control a first grid circuit 34 in accordance with the muting signal. In addition to these, the first grid muting circuit includes the first grid circuit 34 connected to the output terminal of the first grid muting control portion 33 controls a first grid G1 of a CRT for controlling the back raster of the CRT, in accordance with the control signal from the first grid muting control portion 33 and a blanking signal from a vertical blanking circuit (not shown).

The output terminal of the video contrast portion 32 is connected to the video drive circuit, and the input terminal of the first grid circuit 34 is connected to the vertical blanking circuit.

FIG. 4 is a detailed circuit diagram embodying the first muting circuit shown in FIG. 3, wherein the video contrast portion 32 is formed of a transistor Q2 turned on/off in response to the muting signal from the microcomputer 30. Here, a bias resistor R13 and a capacitor C4 are connected between the base of the transistor Q2 and the microcomputer 30.

The video muting control portion 31 is constructed such that the collector of the transistor Q2 in the video contrast portion 32 is connected to the emitter of a PNP transistor Q3, and the emitter of the transistor Q3 is commonly connected to the unshown video drive circuit via a power supply voltage of +12 V, a resistor R8 and capacitors C1 and C2.

The base of the transistor Q3 is connected to a variable resistor VR2, resistors R11 and R12 and a Zener diode ZD2 for a constant voltage via a capacitor C3 and a resistor R10, thereby allowing for the supply of the power supply voltage of +12 V.

Meanwhile, in the first grid muting control portion 33, Zener diodes ZD3 and ZD4 for dropping a predetermined voltage of 30 V in accordance with the muting signal from the microcomputer 30 are serially connected among the microcomputer 30, a resistor R14 and a capacitor C5, and the base of a transistor Q4 is connected to the anode side of the Zener diode ZD4.

The power supply voltage of −30 V is commonly supplied to the base of the transistor Q4 via a resistor R15. A resistor R18 and a variable resistor VR3 for distributing the voltage are connected to the collector of the transistor Q4 and a resistor R17 via a resistor R16, thereby controlling a first grid voltage.

On the other hand, in the first grid circuit 34, the unshown vertical blanking circuit is connected to the base of a transistor Q5 via a resistor R21 and a capacitor C6, and the collector of the transistor Q5 is connected to a first grid G1 via a diode D1, a resistor R1 and a capacitor C7. At this time, the first grid G1 is commonly connected to the resistor R17 in the first grid muting control portion 33.

Figure 5:
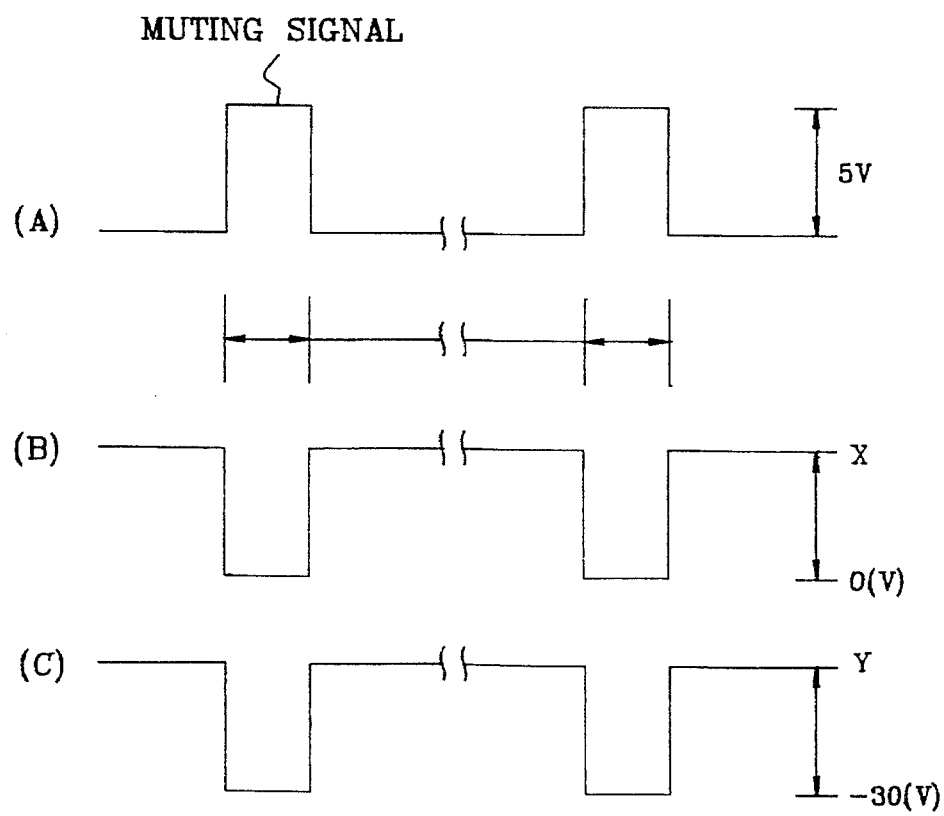

FIG. 5 shows waveforms illustrating the operational status of the first grid muting circuit according to the present invention. Here, FIG. 5A is a waveform showing the muting signal from the microcomputer 30, FIG. 5B is a waveform showing the voltage upon the emitter of the transistor Q3 in the video muting control portion 31, and FIG. 5C is a waveform showing the voltage upon the collector of the transistor Q4 in the first grid muting control portion 33.

The first grid muting circuit according to the present invention takes the control of the first grid as an example even though any portion of the CRT may be controlled during power-on or mode conversion state, in which the display of the raster distortion can be prevented during the power-on or mode conversion state since the back raster is revived in an analog system.

Thus, the microcomputer 30 detects the horizontal and vertical sync signals to output the muting signal to both the video muting control portion 31 and the first grid muting control portion 33 during the power-on or mode conversion state.

The video muting control portion 31 outputs the control signal to the video contrast portion 32 in accordance with the muting signal of the microcomputer 30 to permit the video contrast portion 32 to control the video signal supplied from the computer, thereby controlling the luminescence.

The first grid muting control portion 33 outputs the control signal to the first grid circuit 34 in accordance with the muting signal of the microcomputer 30 to permit the first grid circuit 34 to control the first grid of the CRT, thereby controlling the back raster of the CRT.

In describing the above-stated operation in more detail, when the power supply voltage is supplied and video signal and the horizontal and vertical sync signals are input from the computer, the microcomputer 30 determines whether the current state is the power-on or the mode conversion state.

If the microcomputer 30 determines that the current state is not of the power-on or the mode conversion, the video contrast portion 32 is not subjected to the control since the transistor Q2 of the video contrast portion 32 is turned off. At this time, the power supply voltage of +12 V which will be supplied to the video contrast portion 32 becomes a constant voltage by the resistor R11 and the Zener diode ZD2, and the constant voltage is then distributed by the variable resistor VR2 and the resistor R12 to be supplied to the base of the transistor Q3, so that the transistor Q3 is controlled to thus adjust the voltage supplied to the resistor R8 via the resistor R9.

Consequently, the voltage supplied to the resistor R8 via the transistor Q3 and the resistor R9 controls the video drive circuit via the capacitors C1 and C2 to increase or decrease the video signal.

Here, the resistor R10 and the capacitor C3 are elements to allow for the smooth driving of the transistor Q3.

When the monitor state of the computer is determined as the power-on or the mode conversion by the microcomputer 30 to supply the muting signal of the high level as shown in FIG. 5A from the microcomputer 30 to the transistor Q2 in the video contrast portion 32 via the resistor R13 and the capacitor C4, the transistor Q2 is turned on to control the voltage of X-level formed by the resistor R13 and the transistor Q2 in the video contrast portion 32 as shown in FIG. 5B, thereby controlling the voltage supplied to the resistor R8.

Otherwise, when the microcomputer 30 determines that the state is not of the power-on mode conversion, the transistor Q4 in the first grid muting control portion 33 is turned off to exert no control to the first grid circuit 34.

At this time, the transistor Q5 of the first grid circuit 34 is turned on/off by receiving the blanking signal from the vertical blanking circuit via the resistor R21, the capacitor C6 and the resistor R20, so that the blanking signal is amplified to be supplied to the first grid G1 via the capacitor C7.

When the state of the computer monitor is determined as the power-on or the mode conversion by the microcomputer 30, the muting signal of the high level as shown in FIG. 5A is supplied from the microcomputer 30 to the video muting control portion 31 as well as to the Zener diodes ZD3 and ZD4 via the resistor R14 and the capacitor C5 of the first grid muting control portion 33, thereby dropping the negative power supply voltage of −30 V. The voltage dropped in the Zener diodes DZ3 and ZD4 is supplied to the base of the transistor Q4 via the resistor R15 to turn on the transistor Q4. Since the transistor Q4 is commonly grounded with the negative power supply voltage of −30 V, the resistors R14 and R15, the capacitor C5 and the Zener diodes ZD3 and ZD4 are supplied with the muting signal from the microcomputer 30 to smoothly drive the transistor Q4.

At this time, the resistor R18 and the variable resistor VR3 connected to the collector of the transistor Q4 and the resistor R16 distribute the voltage for controlling the voltage of Y-level formed on the collector of the transistor Q4 to let the transistor Q4 control the first grid voltage as shown in FIG. 5C.

The first grid muting circuit according to the present invention constructed and operated as above detects the power-on or mode conversion state to mute the first grid, so that the raster distortion occurring at the time of power-on or mode conversion is eliminated to provide clearer picture on the monitor.

FIG. 6 is a block diagram showing another embodiment of the first grid muting circuit according to the present invention.

Referring to FIG. 6, the first grid muting circuit has a microcomputer 60 for supplying a muting signal to blocks per corresponding modes, a contrast muting circuit portion 61 connected to one branching point of the output terminal of the microcomputer 60 for muting the muting signal to a predetermined level, and a video circuit 63 connected to the output terminal of the contrast muting circuit portion 61 for outputting the muted signal as a video signal. Also, a first grid muting drive portion 64 is connected to the other branching point of the output terminal of the microcomputer 60 for driving a first grid circuit 62, and a first grid muting control portion 65 is commonly connected with the first grid muting drive portion 64 to the other output terminal of the microcomputer 60 for selectively driving the first muting drive portion 64.

Referring to the detailed circuit diagram of FIG. 7, in the first grid muting control portion 65, resistors R24 and R25 and a capacitor C9 are connected in parallel with the input terminal of a positive power supply voltage +Vcc, and the resistor R24 is connected to the collector of a transistor Q7 which in turn is connected to a capacitor C8 and a switch SW. The base of the transistor Q7 is connected to a resistor R23, and resistors R28 and R30 and a variable resistor VR3 are connected in parallel between the input terminal of a negative power supply voltage −Vcc and the input terminal of the first grid circuit 62.

The first grid muting drive portion 64 includes a transistor Q8 connected in parallel with the resistors R28 and R30 of the first grid muting control portion 65, a resistor R26 commonly connected between the base and emitter of the transistor Q8, and a Zener diode ZD5 commonly connected between the base of the transistor Q8 and a switch SW of the first grid muting drive portion 64.

Figure 9:
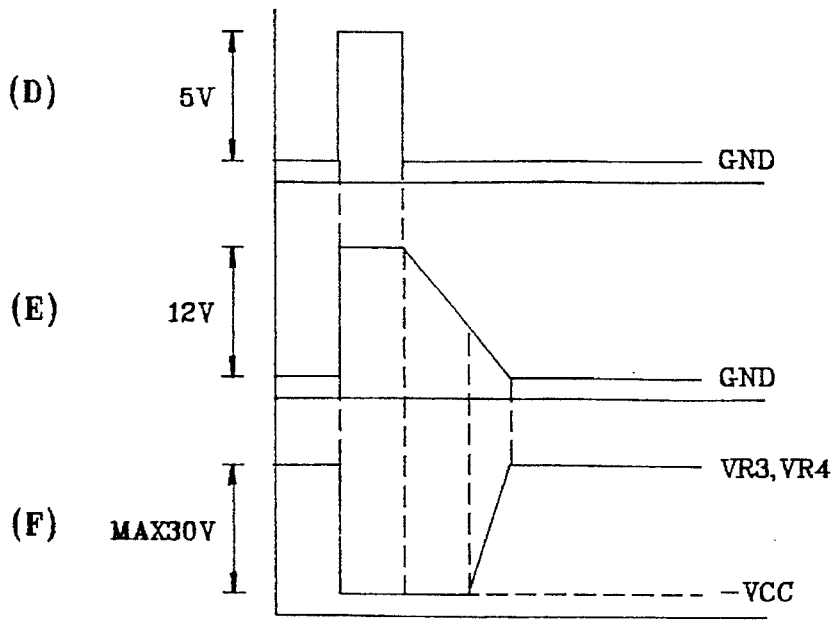

In view of this construction, and referring to the detailed circuit diagram of FIG. 7 and the waveform of FIG. 9, once the muting signal is generated from the microcomputer 60, a predetermined potential is applied to the base of the transistors Q6 and Q7 via the resistors R22 and R23, so that the transistors Q6 and Q7 are turned on.

Here, the transistor Q6 performs contrast-muting of the muting signal to supply the contrasted muting signal to the video circuit 63, and the switch SW is released by the resistor R24 and the capacitor C8 by the turning on the transistor Q7 in the first grid muting control portion 65.

Upon releasing the switch SW, the positive power supply voltage +Vcc drives the transistor Q8 via the resistor R25, capacitor C9 and Zener diode ZD5, and the first grid control voltage produced by the resistors R27 and R29 and the variable resistor VR3 is cut off by the resistor R28, so that the first grid circuit 62 executes the muting of the first grid only. At this time, it can be noted that the waveform as shown in FIG. 9E appears at a node point N4.

If the muting is released, the transistors Q6 and Q7 are turned off but the video contrast muting circuit portion 61 is not affected and the switch SW is shifted to turn off the transistor Q8.

Accordingly, since the first grid voltage (refer to FIG. 9F) formed by the resistors R27 and R29 and the variable resistor VR3 is supplied to the first grid circuit 62 via the resistors R28 and R30, the luma signal level can be controlled.

As described above, the present invention can solve the deterioration of the picture quality caused by the conventional method of simultaneously performing the control of first grid muting and the luma signal level by separately performing the control of the first grid muting and the luma signal level thereby obtaining a clearer picture.

FIG. 8 illustrates a fourth embodiment of the first grid muting circuit according to the present invention which has the same block construction of FIG. 7, except that the switch SW for controlling the first grid muting and the luma signal level is replaced with a switching transistor Q11 in the first grid muting control portion 65.

The description of the construction will thus be omitted. Referring to the detailed block diagram shown in FIG. 8 and the waveforms shown in FIG. 9, since a predetermined potential is applied to the bases of transistors Q9 and Q10 via resistor R31 and R32 when a muting signal is generated from a microcomputer 80, the transistors Q9 and Q10 are turned on. At this time, the transistor Q9 carries out the contrast-muting of the muting signal to supply the contrasted muting signal to a video circuit 83, and the switching transistor Q11 is turned off upon turning on the transistor Q10 by resistors R33 and R40 and a capacitor C10 in a first grid muting control portion 85.

By turning off the switching transistor Q11, a positive power supply voltage +Vcc drives a transistor Q12 via a resistor R34, a capacitor C11 and a Zener diode ZD6, and a first grid control voltage formed by resistors R36 and R38 and a variable resistor VR4 is cut off by a resistor R37 to allow the first grid circuit 82 to perform the first grid muting only. Here, the waveform shown in FIG. 9E appears at a node point N6.

When the muting is released, the transistors Q9 and Q10 are turned off, but a video contrast muting circuit portion 81 is not affected and the switching transistor Q11 is turned on and the transistor Q12 is therefore turned off.

Therefore, the first grid voltage (refer to FIG. 9F) formed by the resistors R36 and R38 is supplied to the first grid circuit 82 via the resistors R37 and R39 to control the luma signal level.

By using the switching transistor without using the switch as shown in FIG. 7, the first grid muting circuit can minutely control the grid control voltage supplied to the first grid circuit and muting operation.

According to the present invention as described above, a first grid is more smoothly muted to accurately perform the operation with respect to power-on or mode conversion state, so that the raster distortion occurring during the power-on or mode conversion state is eliminated to provide a clear picture to a viewer. Moreover, a small-sized transistor is utilized for constituting the elements formed for controlling the first grid to economize the cost.

As a result, the first grid muting circuit according to the present invention adopts variously-embodied first grid muting drive portion connected between the output terminal of a microcomputer and the first grid muting drive portion to obtain several effects.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A first grid muting circuit including a muting detection circuit for receiving horizontal and vertical sync signals from a peripheral circuit to output a muting signal during one of power-on and mode conversion state, a video muting control circuit connected to an output terminal of said muting detection circuit for outputting a control signal to control a video contrast circuit in accordance with said muting signal of said muting detection circuit, and said video contrast circuit being connected to an output terminal of said video muting control circuit for controlling the luminescence of a video signal supplied from a computer in accordance with said control signal from said video muting control portion, said first grid muting circuit comprising:

a microcomputer for supplying said muting signal;

a first grid muting control circuit connected to an output terminal of said microprocessor and responsive to said muting signal from said microcomputer for generating a control signal for controlling a first grid circuit; and said first grid circuit connected to an output terminal of said first grid muting control circuit for controlling a first grid of a cathode ray tube in accordance with said control signal from said first grid muting control circuit to prevent the generation of back raster in said cathode ray tube.

2. A first grid muting circuit having a first grid circuit for controlling the quantity of an electronic beam emitted from a cathode of a cathode ray tube display said grid muting circuit comprising:

a microcomputer for providing a muting control signal;

a video muting circuit connected to an output of said microcomputer, for muting a video signal in response to the control signal of said microcomputer;

a video contrast circuit connected to the output terminal of said video muting circuit for adjusting the muted video signal; and a first grid driving circuit connected to the output terminal of said microcomputer for driving said first grid circuit.

3. A first grid muting circuit including a microcomputer for supplying a muting signal, a contrast muting circuit connected to one branching point of an output terminal of said microcomputer for muting a contrast signal to a predetermined level, a video circuit connected to an output terminal of said contrast muting circuit for outputting the muted contrast signal as a video signal, a first grid drive circuit connected to the other branching point of said output terminal of said microcomputer for driving a first grid circuit, and said first grid circuit for providing a first grid signal at an output thereof for controlling a cathode ray tube vertical blanking circuit in accordance with a control signal of said first grid drive circuit, said first grid muting circuit comprising:

a plurality of switching means connected between said other branching point of said output terminal of said microcomputer and said first grid muting drive circuit for selectively switching a positive power supply voltage in accordance with said muting signal of said microcomputer to output said positive voltage in a first state; and resistor means connected between said first grid muting drive circuit and said first grid circuit for variably adjusting the negative power supply voltage in accordance with a predetermined variable resistance value to output a negative voltage in a second state;

whereby the operation of a muting circuit portion is minutely controlled to provide a stable picture.

4. A first grid muting circuit as claimed in claim 3, wherein said switching means for switching said positive power supply voltage further comprises a switching contact point and a switching transistor.

\* \* \* \* \*